(12) United States Patent
Yamada et al.

(10) Patent No.: US 10,594,186 B2
(45) Date of Patent: Mar. 17, 2020

(54) OUTER ROTOR TYPE MOTOR

(71) Applicant: SHINANO KENSHI KABUSHIKI KAISHA, Nagano (JP)

(72) Inventors: Takuji Yamada, Nagano (JP); Hiroki Kuroiwa, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 127 days.

(21) Appl. No.: 15/862,718

(22) Filed: Jan. 5, 2018

(65) Prior Publication Data

US 2018/0219446 A1 Aug. 2, 2018

(30) Foreign Application Priority Data

Jan. 30, 2017 (JP) ................. 2017-014501

(51) Int. Cl.
 *H02K 1/30* (2006.01)
 *H02K 21/22* (2006.01)
 *H02K 5/173* (2006.01)
 *H02K 7/16* (2006.01)
 *F04D 29/32* (2006.01)
 *G11B 19/20* (2006.01)
 *H02K 1/27* (2006.01)
 (Continued)

(52) U.S. Cl.
 CPC .......... *H02K 5/1737* (2013.01); *F04D 29/329* (2013.01); *G11B 19/2045* (2013.01); *H02K 1/2786* (2013.01); *H02K 7/16* (2013.01); *H02K 9/06* (2013.01); *H02K 21/024* (2013.01); *H02K 21/22* (2013.01); *H02K 1/30* (2013.01)

(58) Field of Classification Search
 CPC ...... H02K 1/2786; H02K 1/30; H02K 5/1737; H02K 21/22; H02K 21/024
 USPC ....................................................... 310/67 R
 See application file for complete search history.

(56) References Cited

U.S. PATENT DOCUMENTS

| 3,691,542 A | 9/1972 | Gabor |
| 4,318,017 A | 3/1982 | Migeon et al. |
| 7,428,087 B1 | 9/2008 | Horng et al. |

(Continued)

FOREIGN PATENT DOCUMENTS

| CN | 204 118 974 | 1/2015 |
| DE | 10 2008 008965 | 8/2009 |

(Continued)

OTHER PUBLICATIONS

Machine Translation, SANO, JP-06189488-A, Jul. 1994. (Year: 1994).*

(Continued)

*Primary Examiner* — Thomas Truong
(74) *Attorney, Agent, or Firm* — Stephen J. Weyer, Esq.; Stites & Harbison, PLLC

(57) ABSTRACT

To provide an outer rotor type motor capable of suppressing the runout of a top surface by improving the strength in a fitted part between a rotor yoke and a rotor shaft and suppressing resonance between vibration generated by rotation of a rotated body to be a load and motor vibration to thereby realize noise reduction. A rotor yoke is configured so that a rotor hub is fitted to a top surface portion formed in a cup shape integrally with a rotor shaft, and a reinforcing hub concentrically fixed to the rotor shaft with the rotor yoke is arranged so as to overlap the rotor hub.

4 Claims, 10 Drawing Sheets

(51) Int. Cl.
*H02K 9/06* (2006.01)
*H02K 21/02* (2006.01)

(56) References Cited

U.S. PATENT DOCUMENTS

| | | |
|---|---|---|
| 2006/0039058 A1 | 2/2006 | Mori |
| 2008/0089626 A1 | 4/2008 | Gotoh et al. |
| 2013/0154415 A1* | 6/2013 | Origlia .................... H02K 1/30 |
| | | 310/89 |
| 2013/0328432 A1 | 12/2013 | Hoemann |
| 2014/0102152 A1* | 4/2014 | Kim .................... D06F 37/304 |
| | | 68/140 |
| 2016/0218581 A1 | 7/2016 | Hill |

FOREIGN PATENT DOCUMENTS

| | | | |
|---|---|---|---|
| JP | 06189488 A | * | 7/1994 |
| JP | H07 332291 | | 12/1995 |
| JP | 2015-001202 | | 1/2015 |
| JP | 2016 086558 | | 5/2016 |

OTHER PUBLICATIONS

Extended European Search Report dated Apr. 19, 2018 in corresponding European Application No. 17210621.3.
Examination Report dated Mar. 18, 2019 in corresponding European Application 17210621.3.

* cited by examiner

OUTER ROTOR TYPE MOTOR

CROSS-REFERENCE TO RELATED APPLICATION

This application is based upon and claims the benefit of priority of the prior Japanese Patent Application No. 2017-014501, filed on Jan. 30, 2017, and the entire contents of which are incorporated herein by reference.

TECHNICAL FIELD

The present invention relates to an outer rotor type motor used as a driving source, for example, for HVAC (Heating, Ventilation, and Air Conditioning) apparatus and the like.

BACKGROUND ART

A brushed motor has been used for an air conditioner that drives an impeller for generating an air flow to rotate by a motor, however, a brushless motor is used in recent years. As a blower motor for HVAC has a high output, and it is necessary to take countermeasures against noise in a motor for an in-vehicle air conditioner. When a natural frequency of the motor corresponds to a frequency of vibration generated with rotation of the impeller, resonance occurs and vibration is increased, as a result, noise is generated.

In view of the above, a bearing housing and a metal adjusting member are arranged in a molding die to be insert molded or the adjusting member is outsert molded in a concave portion provided in the bearing housing, thereby performing adjustment by the adjusting member so that a natural frequency of a device mounting portion fixed to the bearing housing differs from a frequency of vibration propagated from the bearing housing and suppressing the resonance (Patent Literature 1: JP-A 2015-1202).

SUMMARY OF INVENTION

Technical Problem

In the above structure of Patent Literature 1, it is difficult to suppress natural vibration generated from the motor, and the vibration is suppressed by the adjusting member having different natural vibration that is insert molded or outsert molded in the bearing housing.

However, a magnetic attraction force between rotor magnets and stator pole teeth may act on the motor in a radial direction and the runout of a top surface of a rotor yoke may occur in an axial direction. Furthermore, through holes (piercing holes) for reducing weight are provided in a circumferential direction at plural positions on the rotor yoke, therefore, the runout of the top surface tends to occur due to shortage of the strength in a fitted part between a rotor shaft and the rotor yoke.

Accordingly, there is a problem that the resonance tends to occur between the natural frequency of vibration in the motor and a low frequency domain in a fan unit.

To perform insert molding or outsert molding of a member having a different natural frequency and motor components requires man-hours and high manufacture costs.

Solution to Problem

The present invention has been accomplished under the above circumstances, an object thereof is to provide an outer rotor type motor capable of suppressing the runout of a top surface by improving the strength in a fitted part between a rotor yoke and a rotor shaft and suppressing resonance between vibration generated by rotation of a rotated body to be a load and motor vibration to thereby realize noise reduction.

The present invention includes the following structures for achieving the above object.

An outer rotor type motor includes a stator having a stator core in which coils are wound around stator pole teeth and a rotor in which a rotor shaft integrally fastened to a central part of a rotor yoke having rotor magnets facing the stator pole teeth is pivotally supported so as to rotate, in which the rotor yoke is configured so that a rotor hub is fitted to a top surface portion formed in a cup shape integrally with the rotor shaft, and a reinforcing hub concentrically fixed to the rotor shaft with the rotor yoke is arranged so as to overlap the rotor hub.

According to the above structure, the rotor hub is fitted to the top surface portion formed in a cup shape integrally with the rotor shaft, and the reinforcing hub concentrically fixed to the rotor shaft with the rotor yoke is arranged so as to overlap the rotor hub, therefore, the strength in a fitted part between the rotor yoke and the rotor shaft is improved and the runout of the top surface is prevented, and further, resonance with respect to a rotated body (for example, a fan) attached to the rotor shaft can be prevented, therefore, noise reduction can be realized.

It is preferable that the reinforcing hub is arranged so that a flange portion formed on an outer peripheral edge portion of a side portion surrounding a bottom portion formed by drawing a metal plate overlaps the rotor hub.

Accordingly, the mechanical strength is improved by the reinforcing hub that overlaps the rotor hub and a natural frequency of the reinforcing hub differs from a natural frequency of the rotor yoke, therefore, resonance can be prevented. Moreover, the rotor yoke and the reinforcing hub are fastened by being concentrically press-fitted to the rotor shaft, therefore, the assembly does not take labor.

It is desirable that at least any of plural radial ribs in a radial direction and an annular rib that is concentric with the rotor shaft is formed on an inner bottom portion of the rotor hub.

Accordingly, the mechanical strength of the rotor hub itself is improved, therefore, the rotor yoke hardly vibrates with rotation of the rotor.

The reinforcing hub may be arranged so that the flange portion overlaps the annular rib formed in the rotor hub on the inner bottom portion of the rotor yoke or may be arranged so that the flange portion overlaps an annular groove formed in the rotor hub on the top surface's side of the rotor yoke.

Accordingly, the mechanical strength of the rotor hub itself is improved as well as the mechanical strength of the rotor yoke is further improved by the reinforcing hub that overlaps the rotor hub, therefore, the runout of the top surface in the rotor yoke hardly occurs and noise reduction can be realized.

As plural through holes may be formed in the rotor yoke in a circumferential direction, it is possible to reduce weight of the rotor yoke and the strength of the rotor yoke can be improved, therefore, noise reduction can be realized.

Advantageous Effects of Invention

It is possible to provide an outer rotor type motor capable of suppressing the runout of a top surface by improving the strength in a fitted part between a rotor yoke and a rotor shaft and suppressing resonance between vibration generated by rotation of a rotated body to be a load and motor vibration to thereby realize noise reduction.

DESCRIPTION OF EMBODIMENTS

First Embodiment

Hereinafter, an outer rotor type motor according to an embodiment of the present invention will be explained with reference to attached drawings shown in FIG. 1 to FIG. 5. The embodiment will be explained by citing a case where the outer rotor type motor is used as a driving source for an in-vehicle blower. A DC brushless motor is used as the outer rotor type motor.

Figure 1:
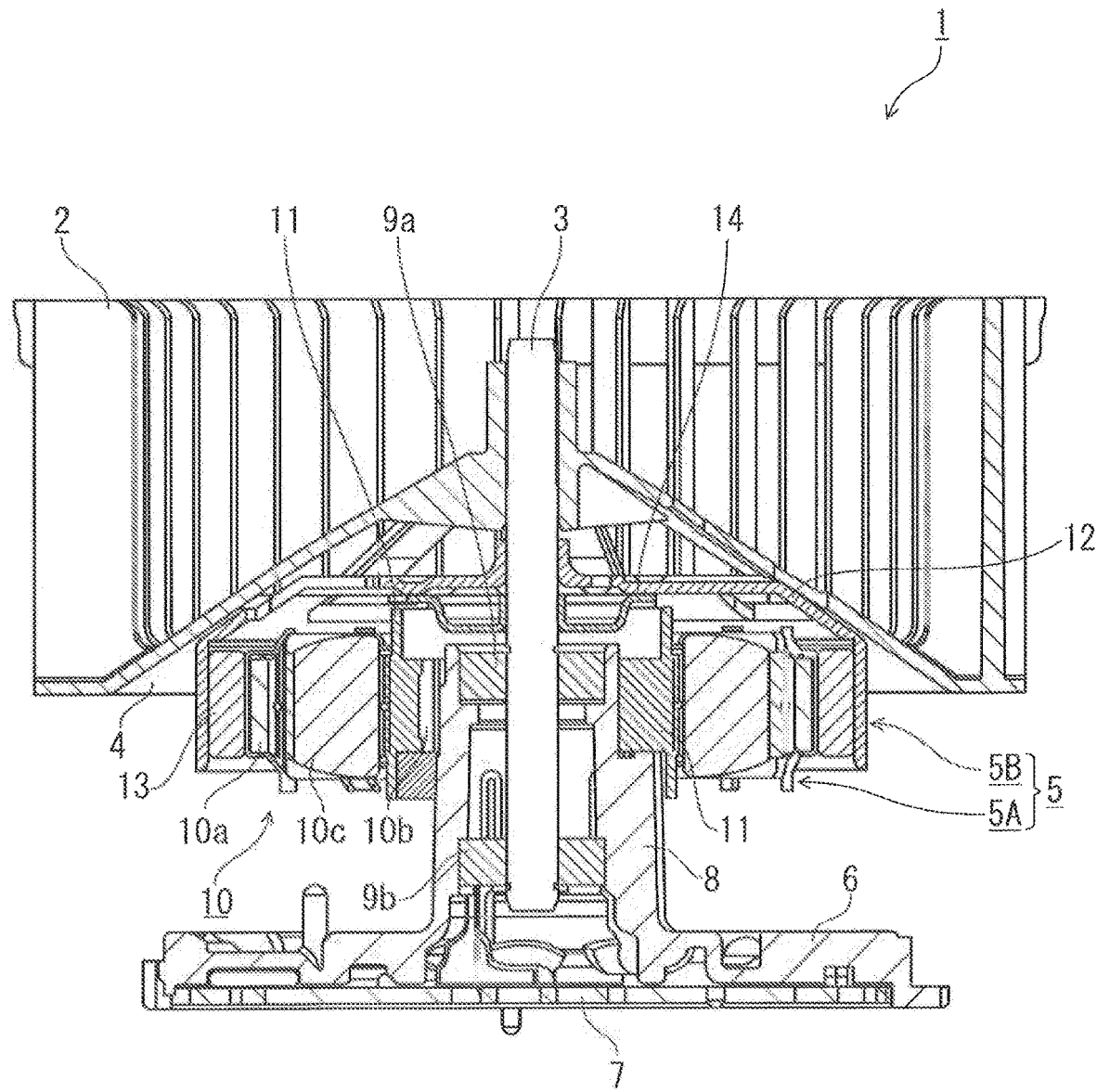
FIG. 1 is an axial sectional view of a blower including an outer rotor type motor according to a first embodiment.

As shown in FIG. 1, a blower 1 is configured so that an impeller 2 is coaxially fixed just above a motor 5 fastened to a rotor shaft 3. The motor 5 includes a stator 5A and a rotor 5B. When the motor 5 is activated, the blower 1 is configured to suck outside air into a not-shown blower case from an axial direction by rotation of the impeller 2 to blow compressed air from an outer peripheral direction of the impeller 2. A concave portion (housing space 4) is formed on a lower side of the impeller 2 in the axial direction, and the later-described rotor 5B is fixed in the housing space 4 at a position overlapping the impeller 2 in the axial direction.

A structure of the stator 5A will be explained. A motor substrate 7 is attached to a motor base portion 6. The motor substrate 7 is provided with a drive circuit that drives the motor 5 to be controlled. Coil leads drawn from motor coils are connected to the motor substrate 7.

A cylindrical bearing housing 8 is integrally formed with the motor base portion 6 so as to stand. A pair of bearing portions (ball bearings) 9a and 9b are provided in a cylindrical hole of the bearing housing 8. One end side of the rotor shaft 3 is pivotally supported so as to rotate by the pair of bearing portions 9a and 9b. A stator core 10 is fitted to an outer peripheral surface of the bearing housing 8. In the stator core 10, plural stator pole teeth 10a are provided to radially protrude to the outside in the radial direction from an annular core back portion 10b. Motor coils 10c are wound around respective pole teeth 10a through insulators 11.

Figure 2:
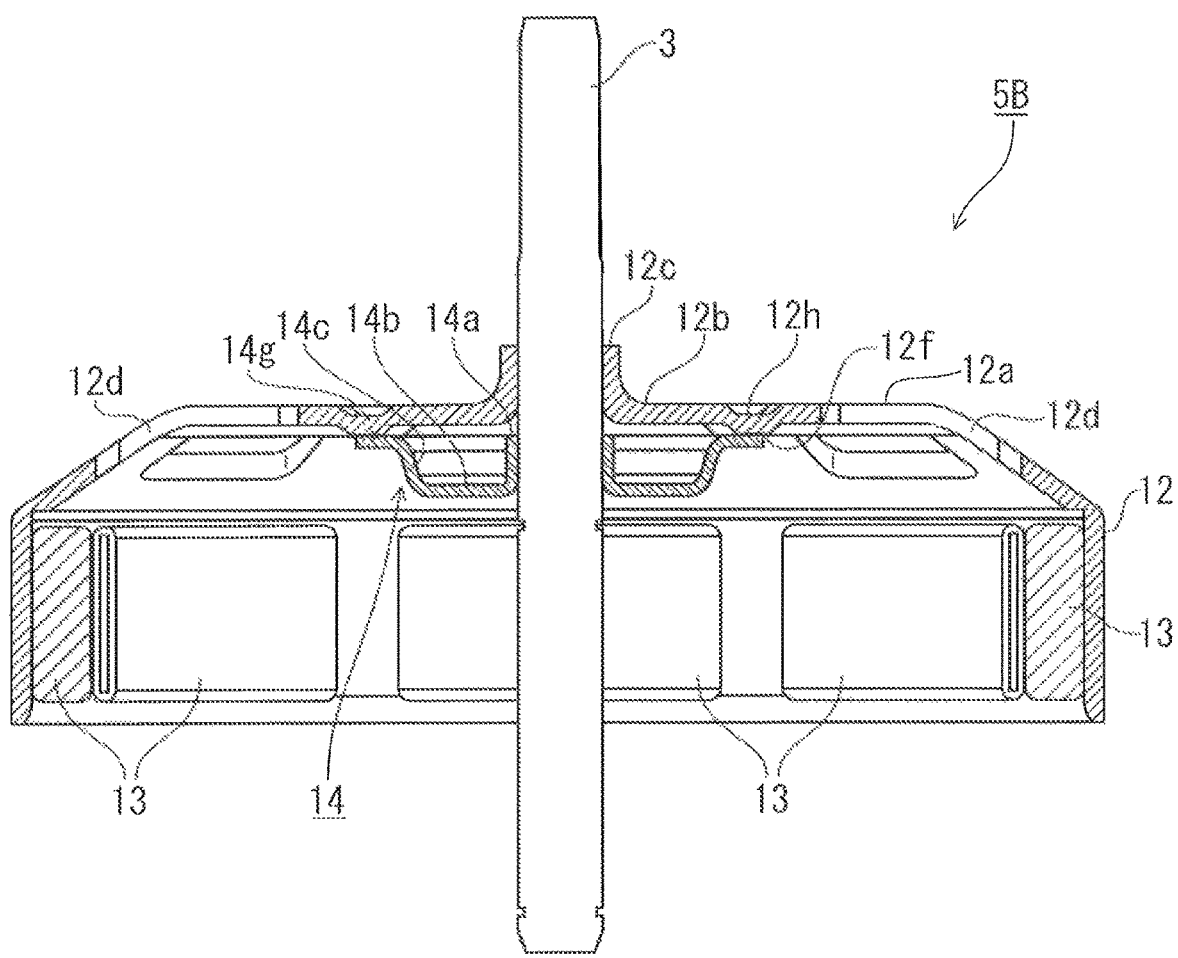
FIG. 2 is an axial sectional view of a motor part of FIG. 1.

Next, a structure of the rotor 5B will be explained with reference to FIG. 2. One end of the rotor shaft 3 is rotatably supported by the pair of bearing portions 9a and 9b (refer to FIG. 1). On the other end side of the rotor shaft 3, a rotor yoke 12 formed in a cup shape is integrally fitted to a cylindrical boss portion 12c formed to stand on a rotor hub 12b positioned in a center of a top surface portion 12a by press-fitting, shrink-fitting, bonding or the like. The rotor yoke 12 is arranged in the housing space 4 on an inner diameter side of the impeller 2 so as to overlap the impeller 2 in the axial direction (refer to FIG. 1). Accordingly, it is possible to reduce a size of the blower 1 by suppressing a height of assembly of the impeller 2 and the rotor yoke 12 in the axial direction that are coaxially fixed to the rotor shaft 3.

Figure 4:
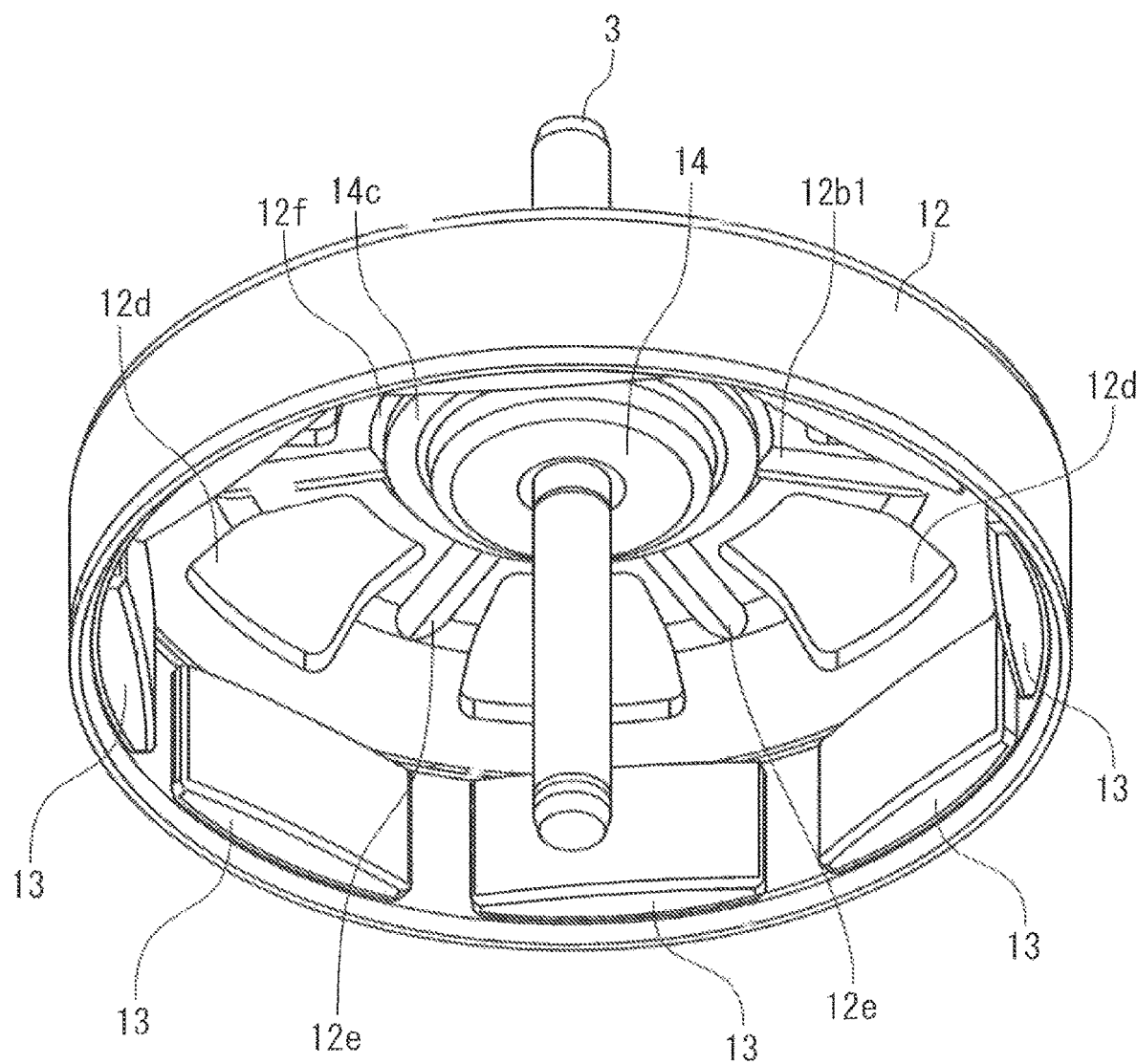
FIG. 4 is a bottom perspective view of the rotor yoke of FIG. 1.

A plurality of rotor magnets 13 divided in a segment state are provided on an inner peripheral side of an annually-formed side surface of the rotor yoke 12 (refer to FIG. 4). The rotor magnets 13 are arranged at given intervals by using any one of through holes 12d provided in the rotor yoke 12 as a reference. As shown in FIG. 2, respective rotor magnets 13 are bonded and fixed to the inner peripheral surface of the rotor yoke 12 so as to face tip end surfaces (magnetic-flux action surfaces: refer to FIG. 1) of the stator pole teeth 10a of the stator core 11.

Figure 3:
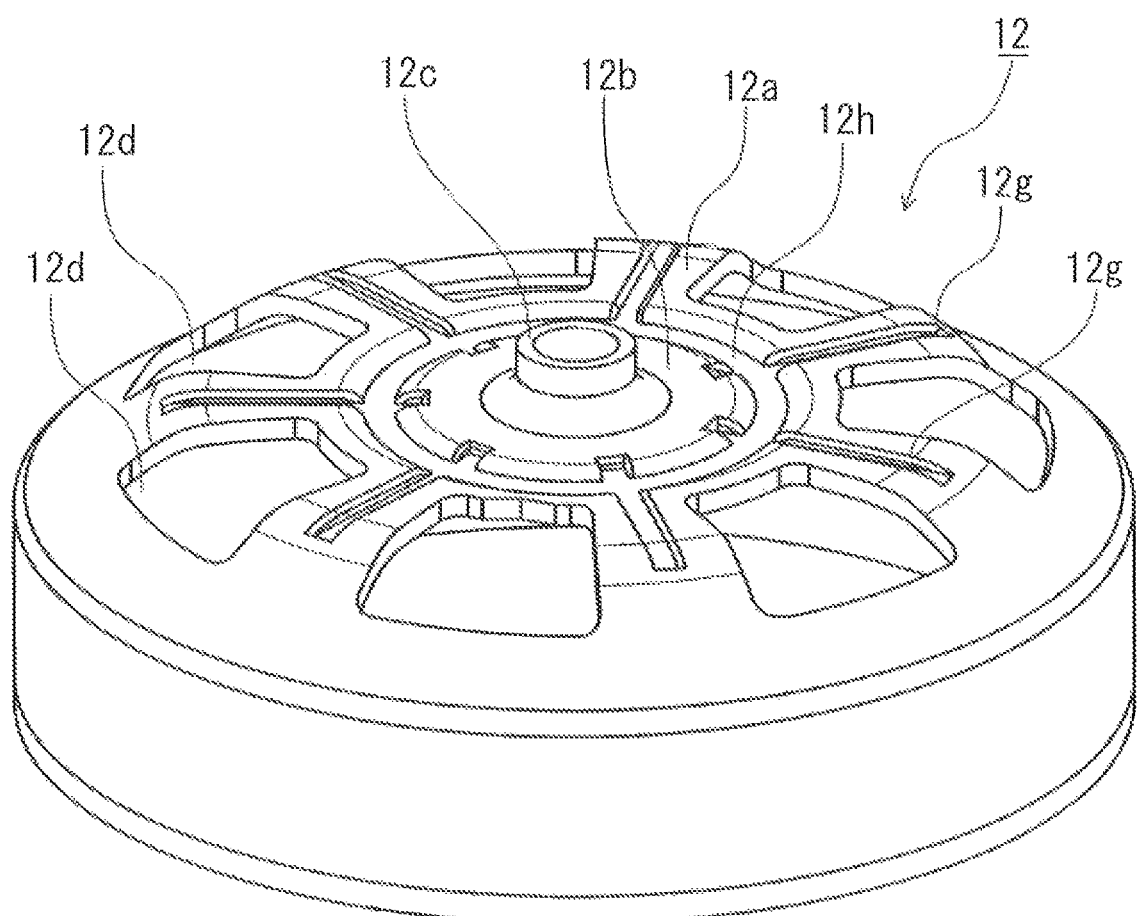
FIG. 3 is a top perspective view of a rotor yoke of FIG. 1.

As shown in FIG. 3, the cylindrical boss portion 12c is formed to stand on the rotor hub 12b at the center of the top surface portion 12a in the rotor yoke 12. The rotor shaft 3 is integrally fitted to the boss portion 12c by press-fitting, shrink-fitting, bonding or the like. The top portion 12a is also provided with the plural through holes (piercing holes) 12d at equal intervals in the circumferential direction. These through holes 12d are provided for reducing weight of the rotor yoke 12.

Figure 5:
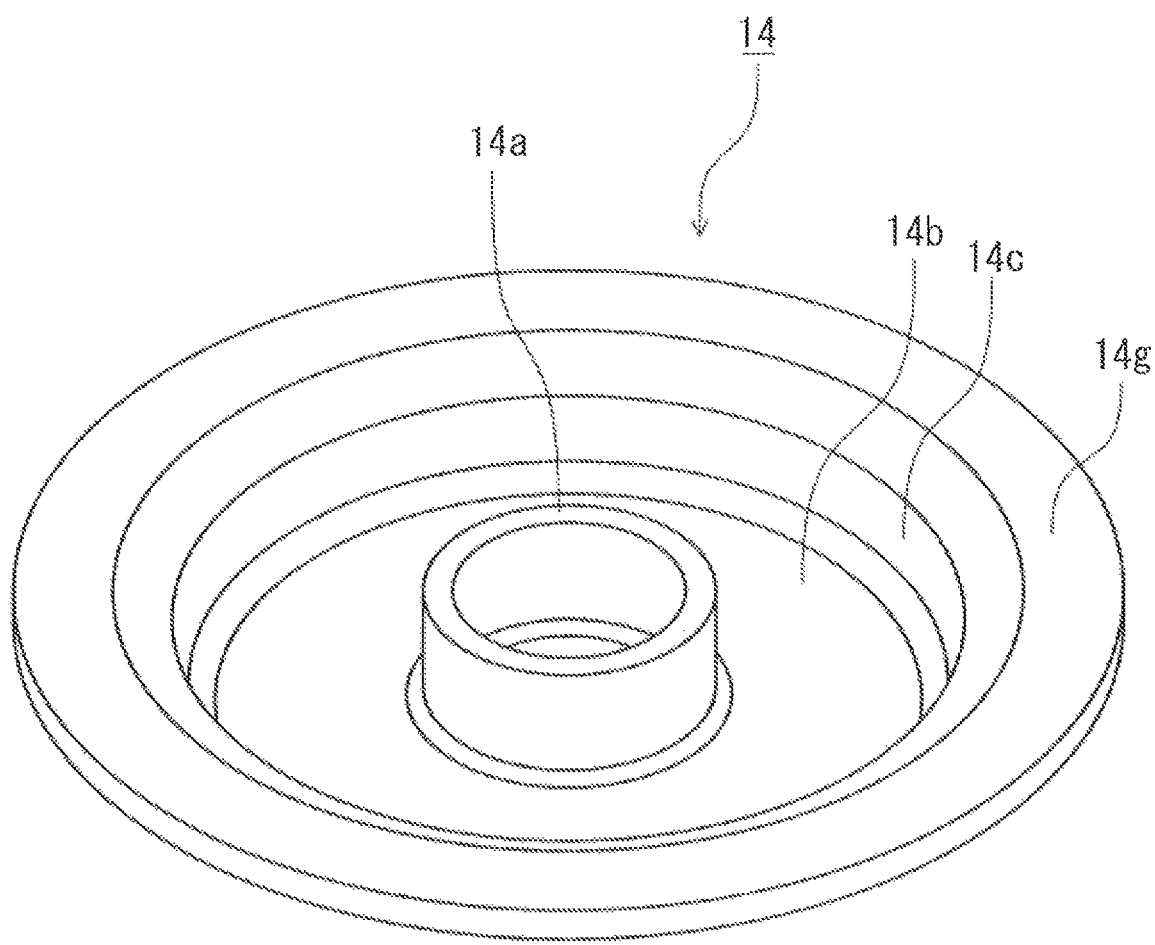
FIG. 5 is a perspective view of a reinforcing hub of FIG. 1.

Moreover, as shown in FIG. 4, a disc-shaped reinforcing hub 14 and the rotor shaft 3 are integrally attached to an inner bottom portion 12b1 of the rotor hub 12b, which is concentrically fixed to the rotor hub 12b so as to overlap the rotor hub 12b. As shown in FIG. 5, the reinforcing hub 14 is arranged so that a flange portion 14g formed on an outer peripheral edge portion of a side portion 14c surrounding a bottom portion 14b formed by drawing a metal plate such as SUS overlaps the rotor hub 12b.

In the reinforcing hub 14, a cylindrical boss portion 14a formed by performing burring is formed to stand on the center of the bottom portion. The rotor shaft 3 is integrally fitted to a cylindrical hole of the boss portion 14a by press-fitting, shrink-fitting, bonding or the like (refer to FIG. 2).

According to the above, the strength in a fitted part between the rotor yoke 12 and the rotor shaft 3 is improved to thereby suppress the runout of the top surface, and a natural frequency of vibration in the motor is allowed to differ from a frequency of vibration generated by rotation of the impeller 2 (rotated body) to be a load to thereby prevent resonance and realize noise reduction.

As shown in FIG. 4, it is preferable that at least any of plural radial ribs 12e (radial grooves 12g when seeing the top surface portion 12a from above: FIG. 3) in the radial direction and an annular rib 12f (an annular rib 12h when seeing the top surface portion 12a from above: FIG. 3) that is concentric with the rotor shaft 3 is formed on the inner bottom portion 12b1 of the rotor hub 12b. In the embodiment, the radial ribs 12e (radial grooves 12g: FIG. 3) are formed so as to cross the annular rib 12f (annular groove 12h: FIG. 3).

The reinforcing hub 14 is arranged so that the flange portion 14g (outer peripheral edge portion) overlaps the annular rib 12f concentrically formed in the rotor hub 12b on the inner bottom portion's side of the rotor yoke 12 formed in the cup shape.

According to the above, since the mechanical strength of the rotor hub 12b itself is improved and the strength of the rotor yoke 12 is further improved by the reinforcing hub 14 formed so as to overlap the rotor hub 12b, the rotor yoke 12 hardly vibrates and noise reduction can be improved.

There is a danger that noise is generated particularly in the case of the motor for the in-vehicle air conditioner due to resonance between the natural frequency of vibration of the motor and the air conditioner unit, however, it is possible to prevent the runout of the top surface by the ribs provided on the inner bottom portion 12b1 of the rotor hub 12b in the rotor yoke 12 and to realize noise reduction by changing the frequency of vibration into a frequency at which resonance does not occur by allowing the reinforcing hub 14 to overlap with the rotor hub 12b.

Second Embodiment

Next, another example of a blower including an outer rotor type motor will be explained with reference to FIG. 6 to FIG. 10. The same numbers are added to the same components as the first embodiment, and explanation is cited.

Though structures of the impeller 2 and the motor 5 according to the embodiment are the same as those of the first embodiment, a structure and an installation position of the reinforcing hub 14 installed to the rotor shaft 3 with the rotor yoke 12 are different.

Figure 7:
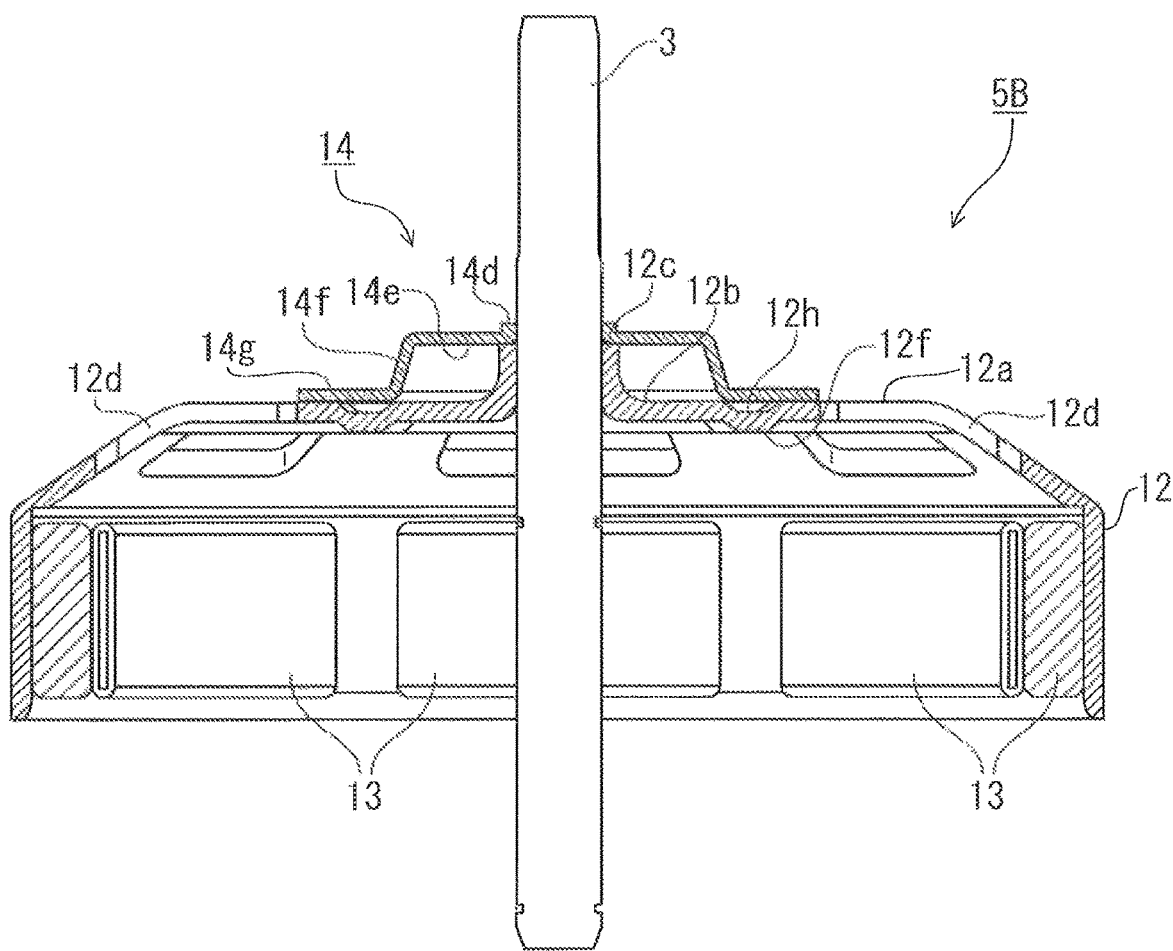
FIG. 7 is an axial sectional view of a motor part of FIG. 6.
Figure 8:
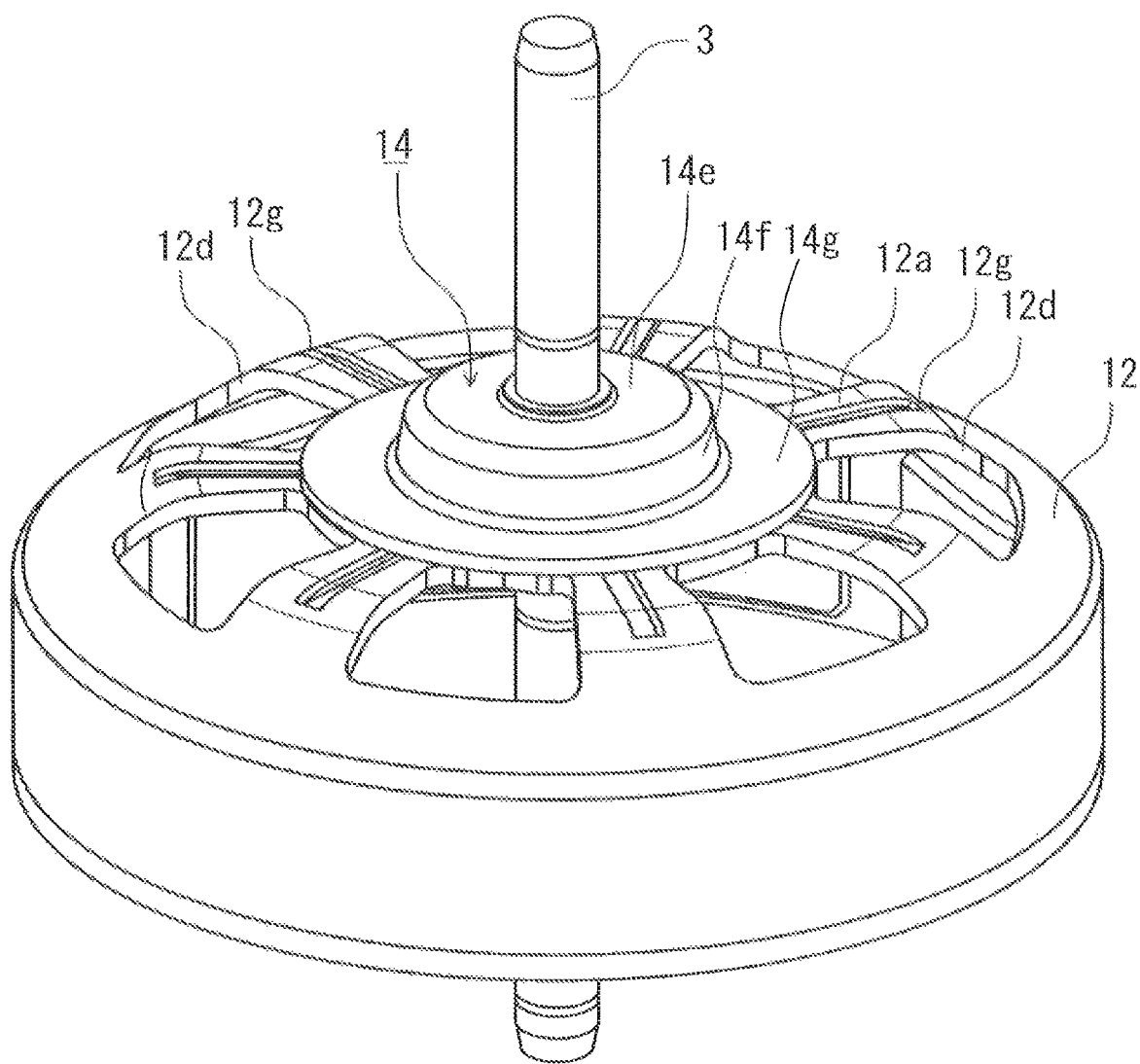
FIG. 8 is a top perspective view of a rotor yoke of FIG. 6.
Figure 9:
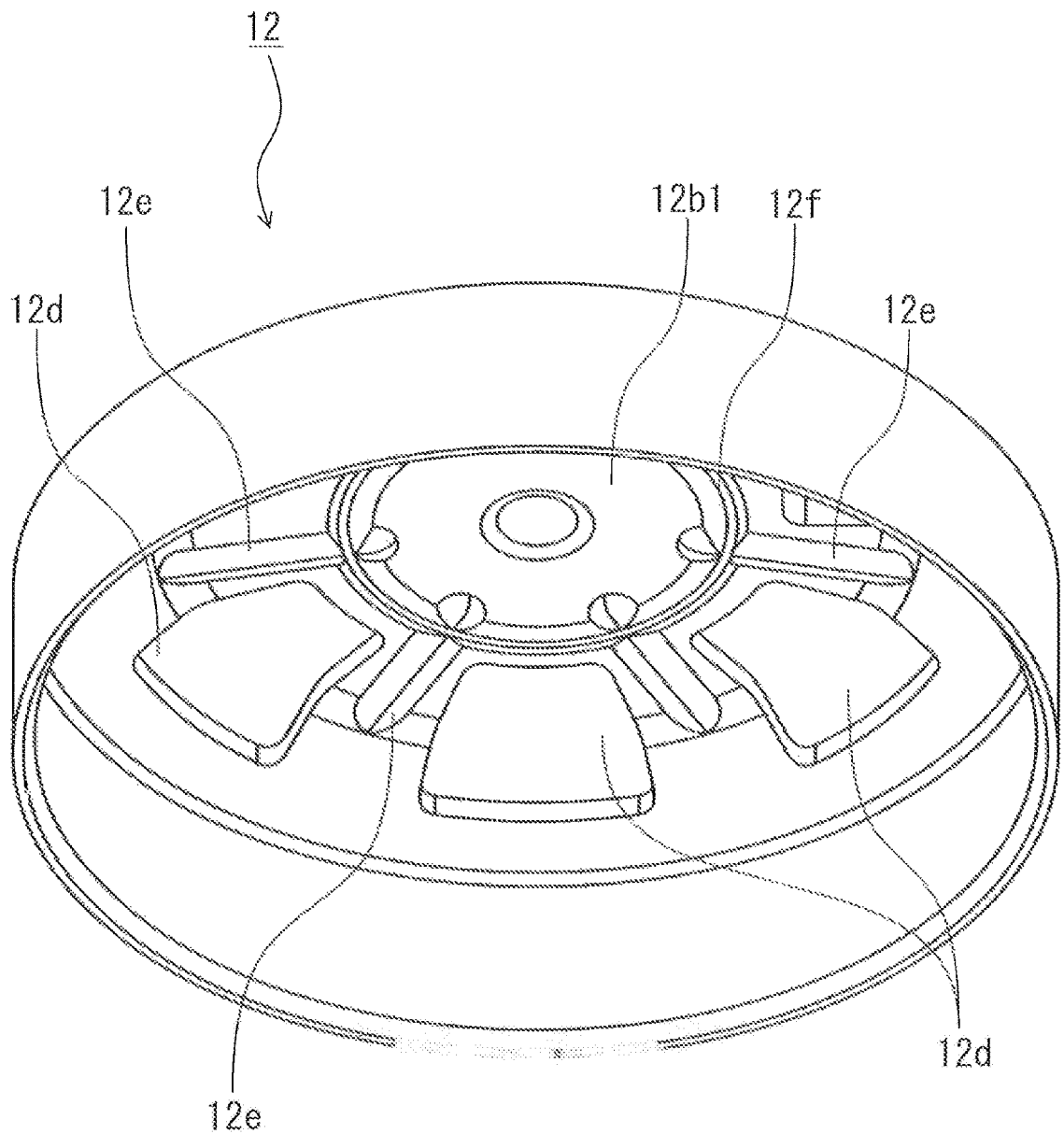
FIG. 9 is a bottom perspective view of the rotor yoke of FIG. 6.

As shown in FIG. 9, the plural radial ribs 12e (the radial grooves 12g when seeing the top surface portion 12a from above: FIG. 8) in the radial direction and the annular rib 12f (the annular groove 12h when seeing the top surface portion 12a from above: FIG. 7) that is concentric with the rotor shaft 3 are formed on the inner bottom portion of 12b1 of the rotor hub 12b in the same manner as the first embodiment.

Figure 6:
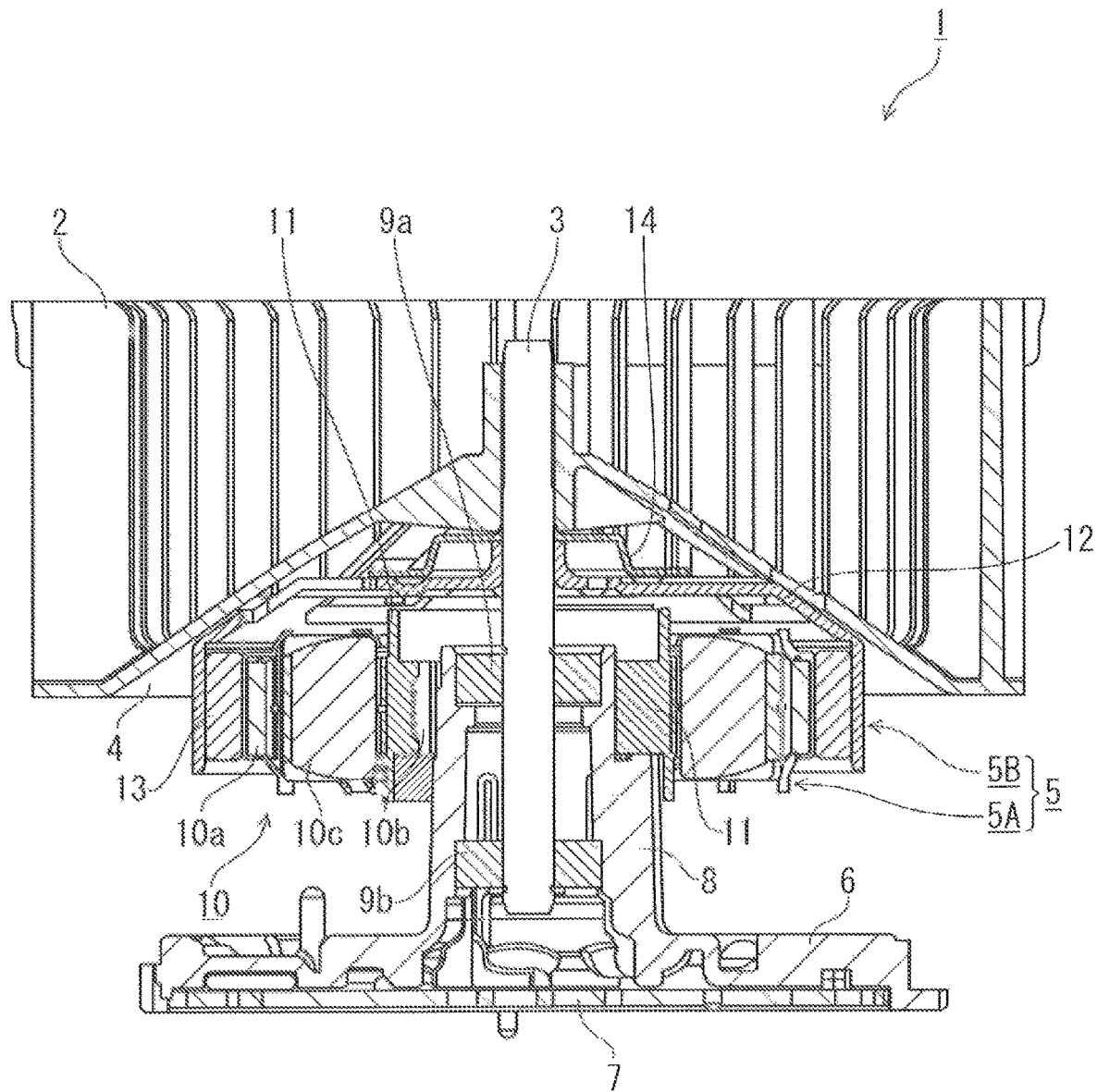
FIG. 6 is an axial sectional view of a blower including an outer rotor type motor according to a second embodiment.

As shown in FIG. 6 and FIG. 7, the reinforcing hub 14 is provided so that the flange portion 14g as an outer peripheral edge portion overlaps the annular groove 12h formed in the rotor hub 12b on the top surface 12a side of the rotor yoke 12.

Figure 10:
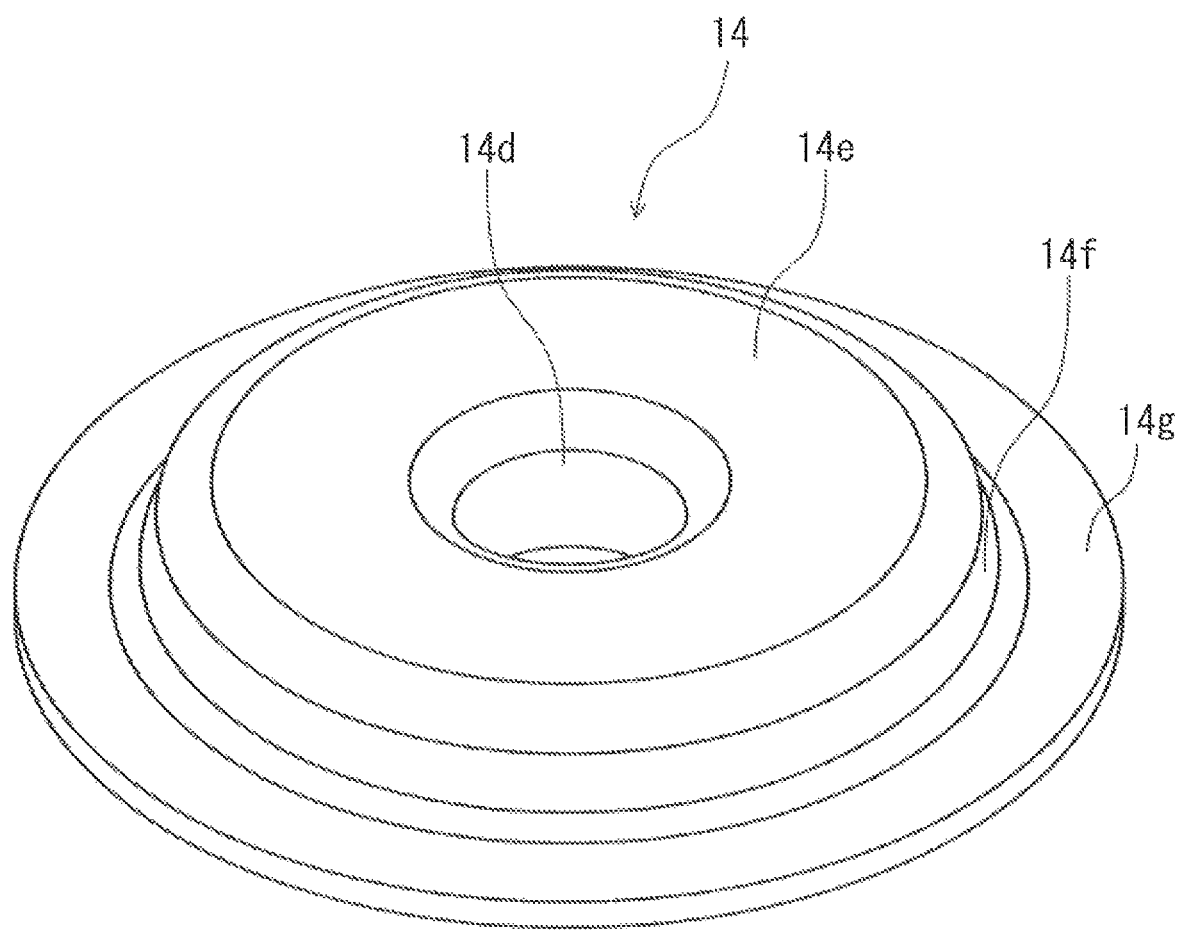
FIG. 10 is a perspective view of a reinforcing hub of FIG. 6.

That is, as shown in FIG. 10, the reinforcing hub 14 is attached so that the flange portion 14g formed on the outer peripheral edge portion of a side portion 14f surrounding an inner bottom portion 14e formed by drawing a metal plate such as SUS overlaps the rotor hub 12b.

In the reinforcing hub 14, a center hole 14d is drilled in the center of the inner bottom portion 14b. The rotor shaft 3 is integrally fitted to the center hole 14d by press-fitting, shrink-fitting, bonding or the like (refer to FIG. 7).

Specifically, as shown in FIG. 7 and FIG. 8, the reinforcing hub 14 is arranged so that the flange portion 14g (outer peripheral edge portion) overlaps the annular groove 12h concentrically formed in the rotor hub 12b on the top surface 12a side of the rotor yoke 12 formed in the cup shape.

As shown in FIG. 6, the reinforcing hub 14 is housed in the housing space 4 of the impeller 2 and integrally fastened to the rotor shaft 3 while being attached to the top surface 12a of the rotor yoke 12 in the overlapped manner.

Also according to the above structure, the mechanical strength of the rotor hub 12b itself is improved and the strength of the rotor yoke 12 is further improved by the reinforcing hub 14 that overlaps the rotor hub 12b, therefore, the runout of the top surface of the rotor yoke 12 hardly occurs and noise reduction can be realized.

Though the radial ribs 12e and the annular rib 12f formed in the rotor hub 12b of the rotor yoke 12 are preferably formed so as to be convex toward the inner bottom portion 12b1 side, it is also preferable that they are formed so as to be convex toward the top surface 12a side.

Moreover, the number of radial ribs 12e and the number of annular rib 12f are not limited to the state disclosed in the embodiments and may be larger as well as smaller.

The shape of the reinforcing hub 14 is not limited to the disc shape, and may be other shapes such as a flower shape and a hook shape.

Furthermore, it is preferable that the reinforcing hub 14 is arranged so as to overlap the inner bottom portion 12b1 of the rotor yoke 12 because generation of noise can be suppressed and the height of the rotor in the axial direction can be suppressed as compared with the case where the reinforcing hub 14 is arranged so as to overlap the top surface portion 12a.

What is claimed is:

1. An outer rotor type motor comprising:
   a stator having a stator core in which coils are wound around stator pole teeth; and
   a rotor in which a rotor shaft integrally fastened to a central part of a cup-shaped rotor yoke having rotor magnets facing the stator pole teeth is pivotally supported so as to rotate,
   wherein the rotor yoke includes a rotor hub fitted to a top surface portion of the rotor yoke integrally with the rotor shaft,
   an annular rib that is concentric with the rotor shaft is formed on an inner bottom portion of the rotor hub, and
   a flange portion surrounding a bottom portion of a reinforcing hub formed by drawing a metal plate is arranged to overlap the annular rib, in an axial direction of the outer rotor type motor, in a state where the bottom portion is directed outward, the reinforcing hub is concentrically fixed to the rotor shaft.

2. The outer rotor type motor according to claim 1, wherein plural radial ribs that cross the annular rib are formed in the inner bottom portion of the rotor hub.

3. The outer rotor type motor according to claim 1, wherein plural through holes are formed in the rotor yoke in a circumferential direction.

4. An outer rotor type motor comprising:
   a stator having a stator core in which coils are wound around stator pole teeth; and
   a rotor in which a rotor shaft integrally fastened to a central part of a cup-shaped rotor yoke having rotor magnets facing the stator pole teeth is pivotally supported so as to rotate,
   wherein the rotor yoke includes a rotor hub fitted to a top surface portion of the rotor yoke integrally with the rotor shaft,
   an annular groove that is concentric with the rotor shaft is formed on an outer top surface portion of the rotor hub, and
   a flange portion formed on an outer peripheral edge portion of a reinforcing hub formed by drawing a metal plate is arranged to overlap the annular groove, in an axial direction of the outer rotor type motor, in a state where a top portion of the reinforcing hub is directed downward, the reinforcing hub is concentrically fixed to the rotor shaft.

* * * * *